D. T. FISHER.
ELECTRIC LOCOMOTIVE WITH CABLE REELING MECHANISM.
APPLICATION FILED JULY 22, 1911.
1,124,003.
Patented Jan. 5, 1915.
3 SHEETS—SHEET 1.
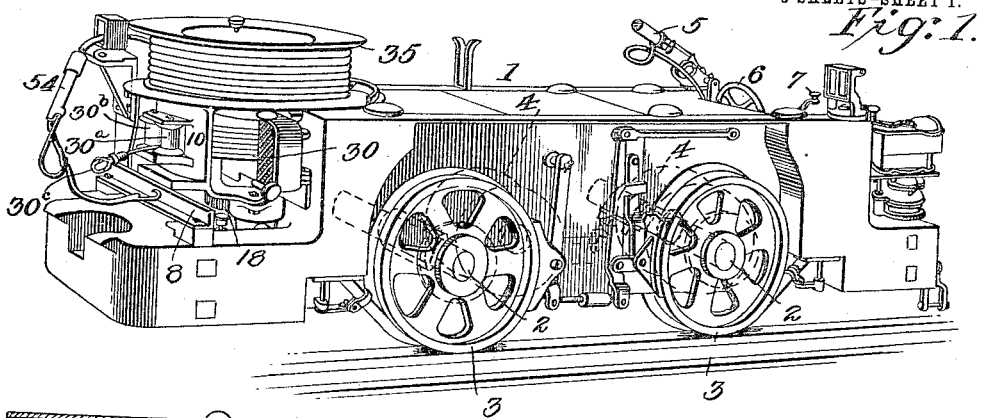
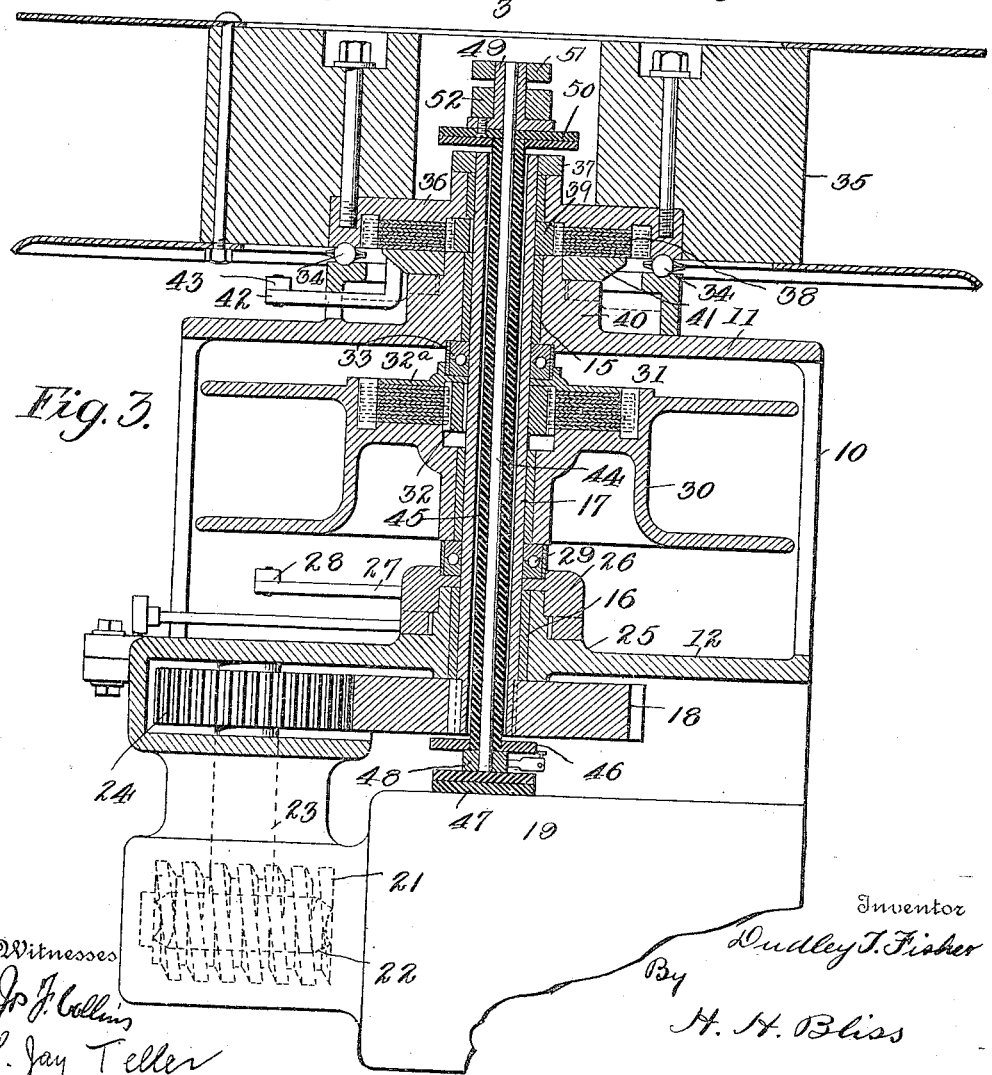

D. T. FISHER.
ELECTRIC LOCOMOTIVE WITH CABLE REELING MECHANISM.
APPLICATION FILED JULY 22, 1911.
1,124,003.
Patented Jan. 5, 1915.
3 SHEETS—SHEET 2.
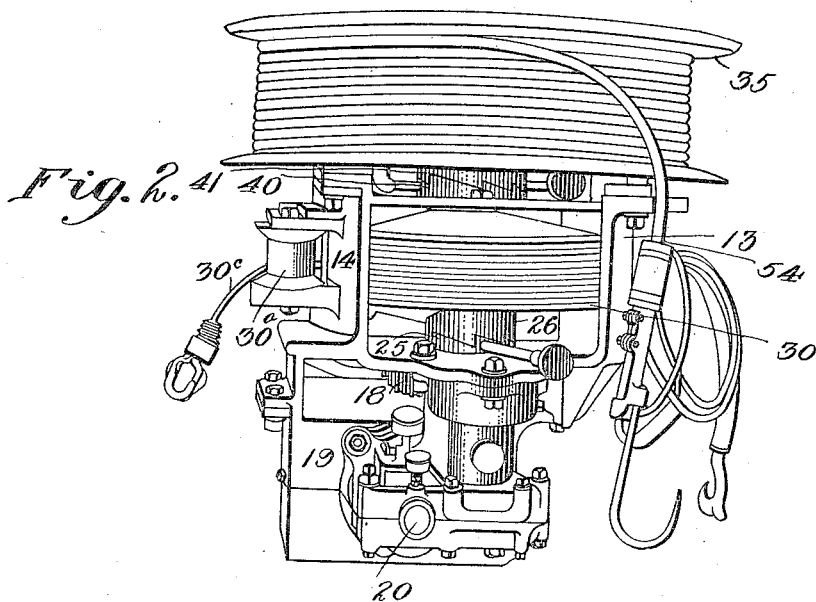
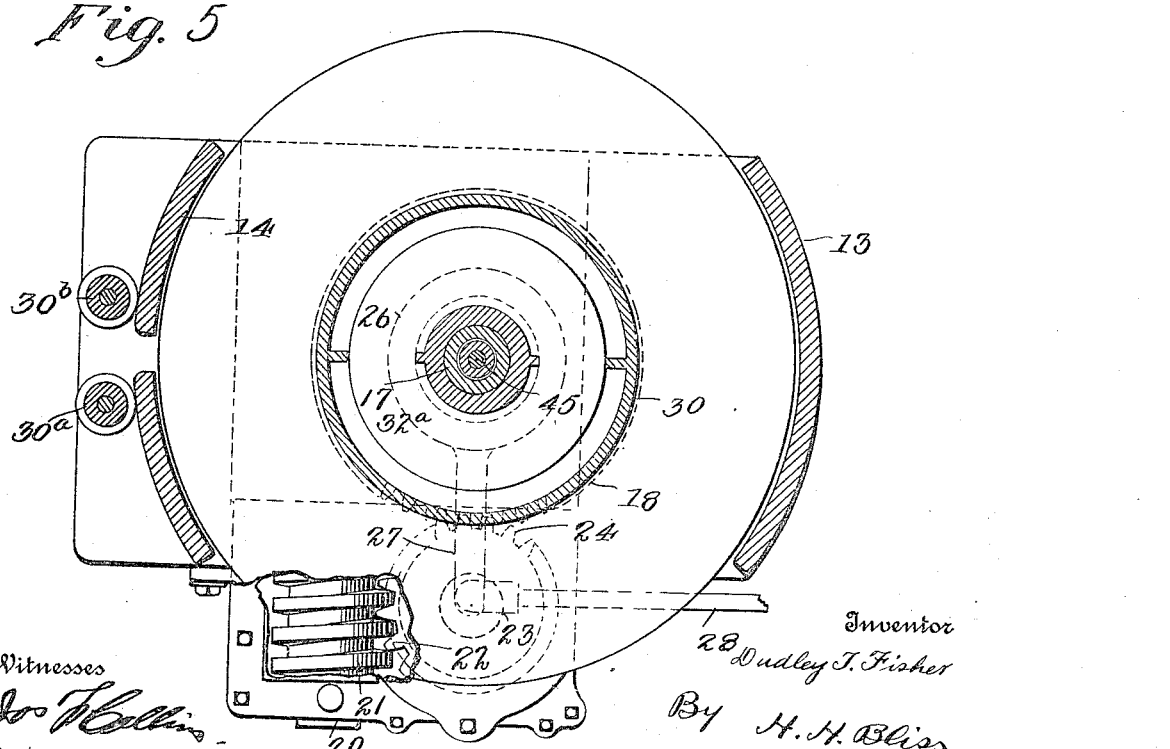

Inventor
Dudley T. Fisher
H. H. Bliss
By
Attorney

Witnesses

UNITED STATES PATENT OFFICE.

DUDLEY T. FISHER, OF COLUMBUS, OHIO, ASSIGNOR TO THE JEFFREY MANUFACTURING COMPANY, A CORPORATION OF OHIO.

ELECTRIC LOCOMOTIVE WITH CABLE-REELING MECHANISM.

1,124,003.  Specification of Letters Patent.  Patented Jan. 5, 1915.

Application filed July 22, 1911. Serial No. 639,911.

*To all whom it may concern:*

Be it known that I, DUDLEY T. FISHER, a citizen of the United States, residing at Columbus, in the county of Franklin and State of Ohio, have invented certain new and useful Improvements in Electric Locomotives with Cable-Reeling Mechanisms, of which the following is a specification, reference being had therein to the accompanying drawings.

This invention relates to electric locomotives and more especially to locomotives provided with reels or drums for winding and unwinding haulage cables and also with reels or drums for winding and unwinding electric conductor cables.

Locomotives of the class to which my invention relates are especially adapted for use in and about coal and similar mines. In mines of this character there are many side entries and rooms which are provided with tracks, but which are not provided with trolley wires or other electric conductors. When it is desired to run a locomotive into one of these side entries or rooms to remove cars therefrom the conductor cable is connected at its free end with the trolley wire in the main mine entry and current is conducted through the cable to the locomotive motor. As the locomotive advances the cable is unwound from its reel and as the locomotive returns the cable is automatically rewound upon the reel. Sometimes, however, it is not desirable to move the locomotive into the side entries or rooms and, in these cases, use is made of the haulage cable, the free end of which is carried into the said entry or room and secured to a car. The cable is then rewound upon its drum and the car is hauled out. The haulage cable may also be used, when secured to a fixed anchorage, for hauling the locomotive itself.

The object of my invention is to provide a locomotive which has an improved winding mechanism with a drum for a conductor cable and a drum for a haulage cable.

The invention consists in certain improved driving and controlling mechanism and certain new and useful details and arrangement of parts, which will be fully understood from the following specification.

Figure 4:
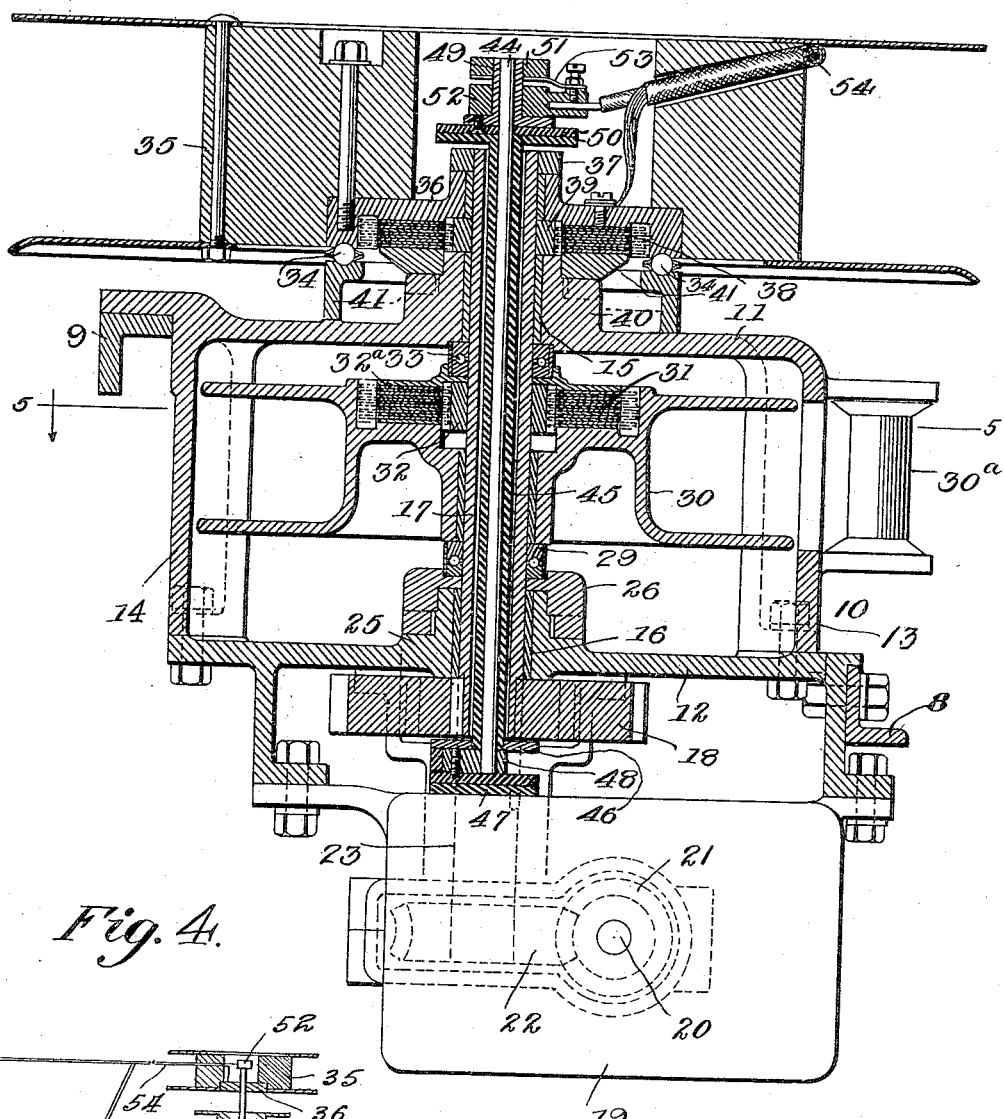
Figure 6:
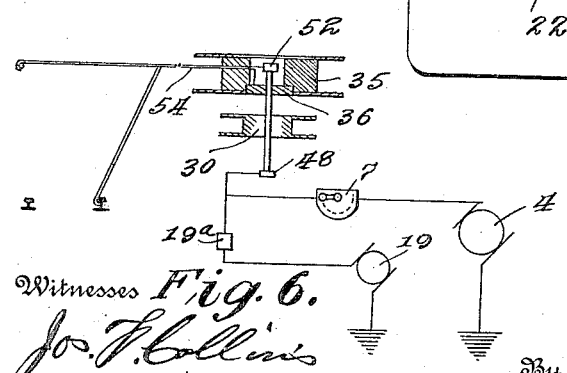

Of the drawings, Figure 1 is a perspective view of a locomotive embodying my invention. Fig. 2 is a perspective view of the reeling mechanism separated from the locomotive. Fig. 3 is a transverse vertical cross sectional view through the reeling mechanism. Fig. 4 is a longitudinal vertical cross sectional view through the reeling mechanism. Fig. 5 is a cross sectional plan view taken along the line 5—5 of Fig. 4. Fig. 6 is a diagrammatic view showing some of the more important electrical connections. In this view the details of the motor wiring are omitted as they constitute no part of this invention.

Referring to the drawings, 1 represents as a whole the locomotive which is mounted upon the axles 2 and the track wheels 3 and is driven by a suitable electric motor 4. The locomotive is provided with the usual trolley pole 5 by means of which current is normally supplied to the locomotive motor. At the operator's end of the locomotive there are the usual controlling devices such as the brake wheel 6 and the controller 7. At the other end of the locomotive there is mounted the cable reeling mechanism to which my invention especially relates. This cable reeling mechanism is preferably supported upon two transverse angle bars 8 and 9 which are secured to the frame of the locomotive.

10 represents the frame upon which the other parts of the reel mechanism are mounted. This frame is boxlike in form and has a top wall 11, a bottom wall 12 and front and back walls 13 and 14, respectively. In suitably bushed bearings 15 and 16 in the top and bottom walls there is rotatably mounted a hollow shaft 17 to the lower end of which is keyed a spur gear 18.

19 represents an electric motor which is suspended from the frame 10 by means of suitable lugs. A controller or switch 19ª is provided in the circuit of the motor 19. Upon the armature shaft 20 of the motor there is secured a worm 21 which meshes with a suitable worm wheel 22 on the vertical shaft 23. At the upper end of the shaft 23 there is a spur pinion 24 which meshes with the spur gear 18.

Surrounding the bearing 16 on the bottom wall 12 of the frame 10 there is a hub 25 which is provided with a circumferential series of upstanding beveled teeth. Above the hub 25 there is rotatably mounted a ring 26 which is provided with a circumferential series of downward extending teeth which are beveled to engage with the teeth of the hub 25. The ring 26 is provided with a radially extending arm 27 with which is connected a link 28 which extends forward to a point within reach of the operator. By means of the link 28 the ring may be rotated and caused to move upward or downward on account of the engagement of its teeth with those of the hub. Above the ring 26 and supported on it by means of the ball bearing 29 is a reel or drum 30 which is normally free to rotate with respect to the shaft 17. The upper part of the hub of the reel 30 is recessed to give room for a friction clutch, which is indicated as a whole by 31. The clutch which I have illustrated is of the disk type and consists of two series of alternately arranged disks, those of one series being secured to the drum and those of the other series being secured to a collar 32, which is keyed to the shaft 17. Above the disks is a plate 32$^a$, and between this plate and the top wall of the frame 10 there is interposed a ball bearing 33. It will be observed that when the rod 28 is tensioned the ring 26 will be rotated and elevated. As the ring is elevated it carries with it the drum, and the upward movement of the drum forces together the disks of the clutch 31 which thereupon transmits to the drum the movement of the shaft 17. A suitable aperture is provided in the front wall 13 of the frame 10, and suitable rollers 30$^a$, 30$^b$ are provided for guiding the haulage cable 30$^c$ as it is wound upon or unwound from the reel 30.

Above the frame 10 and supported upon it by means of the ball bearing 34 is a cable reel or drum 35. This reel is provided with a hub 36, which is rotatable upon the upper end of the shaft 17. A collar 37 on the upper end of the shaft engages the hub 36 and prevents the reel being lifted. The hub 36 is recessed to receive a friction clutch 38. The clutch illustrated is of the disk type and is composed of two series of alternately arranged disks, those of one series being connected with the hub and those of the other series being connected with a collar 39 which is secured to the shaft 17. The bearing 15 on the upper wall 11 of the frame 10 is provided with a hub 40 which has a circumferential series of upward extending beveled teeth. Upon the hub 40 is a rotatable ring 41 which has a circumferential series of downward extending teeth which are beveled and adapted to engage with the teeth on the hub 41. The ring 41 is provided with an arm 42 connected to a rod 43 which extends forward to a point within reach of the operator. By tensioning the rod 43 the ring 41 may be rotated and elevated on account of the cam engagement of its teeth with those of the hub 40. The upward movement of the ring 41 forces together the disks of the clutch 48 and causes power to be transmitted from the shaft 17 to rotate the reel 35.

44 is a stationary rod which extends vertically through the hollow shaft 17. This rod is suitably surrounded by a sleeve or bushing 45 of suitable insulating material. The bottom of the rod 44 is suitably supported on the frame of the motor and is insulated from adjacent metallic parts by means of washers 46 and 47.

48 is a connector to which is secured conductor wires which lead to the motor 19 and also to the main locomotive motor. At the top of the rod 44 is a flanged bushing 49 which is separated from the collar 37 by means of insulating washers 50. Upon the upper end of the bushing 49 is secured a collar 51 and between this collar 51 and the flange of the bushing there is a rotatable connector 52 which is provided with a spring 53 arranged to engage with the collar 51 to provide good electrical contact. In the drawings I have shown a cable 54 which is provided with two conductors. When such a cable is used one of these conductors is connected to the metallic parts of the device, as, for instance, to the hub 36, and the other is secured to the conductor 52.

In operation when it is desired to advance a locomotive into an entry or room by means of current carried through the conductor cable, the clutch 38 is set to offer resistance to the rotation of the reel but not to securely lock it to the shaft 17. The other end of the cable is then connected to suitable conductors, such as the trolley wire, and the track, and the locomotive is moved forward. The cable is unwound from the reel by its own tension. It will be understood that during unwinding the reel motor 19 may be operated or not, as desired. In any case it is the clutch which offers resistance to rotation in the unwinding direction. When the locomotive is returned and the conductor cable is to be rewound upon the reel, the ring 41 is further rotated and elevated to throw the clutch 38 into sufficiently firm engagement to cause enough power to be transmitted from the shaft 17 to rotate the reel 35 in the winding direction. It will be understood that the shaft 17 will rotate faster than the reel is permitted to rotate by the cable and that as a result there will be a constant slippage at the clutch. The construction is, therefore, such that the cable will be subjected to continuous tension, regardless of the rate of travel of the locomotive.

While I have described the operation of the clutch 38 as dependent upon the movement of the ring 41 by the operator, it will be understood that the movement of the ring is in large part automatic. The lowermost disk of the clutch 38 is connected with the reel and, as will be observed in Fig. 2, the direction of slope of the teeth beneath the clutch 38 is such that whenever the reel is permitted by the cable to rotate in the winding direction it tends to carry with it the ring 41 and to automatically cause it to be lifted into firmer engagement with the disks. On the other hand, when the reel is forced by the cable to rotate in the unwinding direction the tendency is for the ring 40 to rotate with it and to be lowered to release the disks of the clutch to a certain extent.

The haulage cable may be used for hauling cars when the locomotive is stationary, or for hauling the locomotive itself when conditions require. When the haulage cable is in use current may be supplied through the conductor cable or through the trolley mechanism. When the haulage cable is being used its free end is secured to a car or to a stationary anchorage, and by means of the link 28 and the ring 26 the clutch 31 is engaged, the clutch 38, of course, having been first disengaged. By changing the position of the ring 26 the power transmitted through the clutch 31 may be varied as desired. When the cable is to be unwound the clutch 31 is, of course, entirely released.

I am aware that locomotives have heretofore been proposed having two reels, one for an electric conductor cable and one for a haulage cable. However, according to these earlier proposals but a single electric motor was provided for driving the locomotive itself and for driving one or both of the reels. There are many advantages incident to the provision of two separate motors. By providing two motors I am enabled to obviate the clutch which would otherwise be necessary between the single motor and the track wheels; I am enabled to operate one or both of the reels by means of the reel motor and at the same time to control the other motor to start or stop the locomotive; and I am enabled to entirely eliminate the disastrous effects resulting from the too fast or too slow winding of the cables which occur in earlier locomotives when the wheels spin on the track or are braked and caused to skid. By the provision of two separate clutches between the reel motor and the two reels, I am enabled to accurately control the operation of both of them.

What I claim is:

1. In an electric locomotive, the combination with the frame, the supporting wheels and the driving motor, of a rotatable reel, an insulated electric conductor cable connected with the reel to be wound thereon, a second rotatable reel, a haulage cable connected with the second reel to be wound thereon and having a tensile strength sufficient for the haulage of cars or for the movement of the locomotive itself, a second motor operable independently of the driving motor and the wheels and having sufficient power to haul a car or move the locomotive, electrical connections between the conductor cable and the two motors, and power connections between the second motor and the two reels comprising two independently operable manually controllable clutches one for each reel.

2. In an electric locomotive, the combination with the frame, the supporting wheels and the driving motor, of a rotatable reel, an insulated electric conductor cable connected with the reel to be wound thereon, a second rotatable reel, a haulage cable connected with the second reel to be wound thereon and having a tensile strength sufficient for the haulage of cars or for the movement of the locomotive itself, a second motor operable independently of the driving motor and the wheels and having sufficient power to haul a car or move the locomotive, electrical connections between the conductor cable and the two motors, and power connections between the second motor and the two reels comprising two independently operable manually controllable friction clutches one for each reel.

3. In an electric locomotive, the combination with the frame, the supporting wheels and the driving motor, of a rotatable reel, an insulated electric conductor cable connected with the reel to be wound thereon, a second rotatable reel, a haulage cable secured to the second reel to be wound thereon and having a tensile strength sufficient for the haulage of cars or for the movement of the locomotive itself, a second motor operable independently of the driving motor and the wheels and having sufficient power to haul a car or move the locomotive, electrical connections between the conductor cable and the two motors, and mechanism between the second motor and the two reels comprising independently operable manually controllable means for rotating or resisting the rotation of either or both reels.

4. In an electric locomotive, the combination with the frame, the supporting wheels and the driving motor, of a rotatable reel, an insulated electric conductor cable connected with the reel to be wound thereon, a second rotatable reel, a haulage cable connected with the second reel to be wound thereon and having a tensile strength sufficient for the haulage of cars or for the movement of the locomotive itself, a second motor operable independently of the driving motor and the wheels and having sufficient power to haul a car or move the locomotive, electrical connections between the conductor cable and the two motors, and mechanism between the second motor and the two reels comprising means supplemental to the motor for transmitting power to rotate the reels when the motor is energized and for automatically resisting rotation of the reels when the motor is not energized.

5. In an electric locomotive, the combination with the frame, the supporting wheels and the driving motor, of a rotatable reel, an insulated electric conductor cable connected with the reel to be wound thereon, a second rotatable reel, a haulage cable connected with the second reel to be wound thereon and having a tensile strength sufficient for the haulage of cars or for the movement of the locomotive itself, a second motor operable independently of the driving motor and the wheels and having sufficient power to haul a car or move the locomotive, electrical connections between the conductor cable and the two motors, and power transmitting mechanism between the second motor and the two reels comprising a worm connected with the motor, a worm wheel meshing with the worm and two independently operable manually controllable clutches interposed between the worm wheel and the two reels respectively.

6. In an electric locomotive, the combination with the frame, the supporting wheels and the driving motor, of a rotatable reel, an insulated electric conductor cable connected with the reel to be wound thereon, a second rotatable reel, a haulage cable connected with the second reel to be wound thereon and having a tensile strength sufficient for the haulage of cars or for the movement of the locomotive itself, a second motor operable independently of the driving motor and the wheels and having sufficient power to haul a car or move the locomotive, electrical connections between the conductor cable and the two motors, and power transmitting mechanism between the second motor and the two reels comprising a worm connected with the motor, a worm wheel meshing with the worm and two independently operable manually controllable friction clutches interposed between the worm wheel and the two reels respectively.

7. In an electric locomotive, the combination with the frame and the supporting wheels, of a vertical shaft, two reels mounted concentrically with the shaft one above the other, an insulated electric conductor cable connected with one reel to be wound thereon, a haulage cable connected with the other reel to be wound thereon and having a tensile strength sufficient for the haulage of cars or for the movement of the locomotive itself, two manually controllable clutches interposed between the shaft and the two reels respectively, a motor connected with the shaft below the lower reel and having sufficient power to haul a car or move the locomotive by means of the haulage cable, and an electrical connection between the electric cable and the motor.

8. In an electric locomotive, the combination with the frame and the supporting wheels, of a vertical shaft, two reels mounted concentrically with the shaft one above the other, a bearing for the shaft below the lower reel, a second bearing for the shaft between the two reels, an insulated electric conductor cable connected with one reel to be wound thereon, a haulage cable connected with the other reel to be wound thereon and having a tensile strength sufficient for the haulage of the cars or for the movement of the locomotive itself, two manually controllable clutches interposed between the shaft and the two reels respectively, a motor connected with the shaft below the lower reel and having sufficient power to haul a car or move the locomotive by means of the haulage cable, and an electrical connection between the electric cable and the motor.

9. In an electric locomotive, the combination with the frame and the supporting wheels, of a vertical shaft, two reels mounted concentrically with the shaft one above the other, an insulated electric conductor cable connected with one reel to be wound thereon, a haulage cable connected with the other reel to be wound thereon and having a tensile strength sufficient for the haulage of cars or for the movement of the locomotive itself, two clutches interposed between the shaft and the two reels respectively, two manually controllable operating means for the respective clutches having abutments located respectively between the reels and below the lower reel, a motor connected with the shaft and having sufficient power to haul a car or move the locomotive by means of the haulage cable, and an electrical connection between the electric cable and the motor.

10. In a electric locomotive, the combination with the frame and the supporting wheels, of two vertical rotatable reels mounted one above the other with their axes in alinement and provided with central openings extending from end to end, an insulated electric conductor cable connected to the upper reel to be wound thereon, a haulage cable connected with the lower reel to be wound thereon and having a tensile strength sufficient for the haulage of cars or for the movement of the locomotive itself, an electric motor having sufficient power to haul a car or move the locomotive, an electric conductor extending through the central openings and connected at one end with the conductor cable and at the other end with the motor, and two independent manually controllable clutches between the motor and the respective reels.

11. In an electric locomotive, the combination with the frame and the supporting wheels, of a hollow vertical shaft connected with the motor to be rotated thereby, two reels mounted concentrically with the shaft, an insulated electric conductor cable connected to the upper reel to be wound thereon, a haulage cable connected with the lower reel to be wound thereon and having a tensile strength sufficient for the haulage of cars or for the movement of the locomotive itself, an electric motor having sufficient power to haul a car or move the locomotive, an electric conductor extending through the hollow shaft and connected at one end with the conductor cable and at the other end with the motor, and two independent manually controllable clutches between the shaft and the respective reels.

12. In an electric locomotive the combination with the frame and the supporting wheels, of a hollow vertical shaft connected with the motor to be rotated thereby, two reels mounted concentrically with the shaft, an insulated electric conductor cable connected to the upper reel to be wound thereon, a haulage cable connected with the lower reel to be wound thereon and having a tensile strength sufficient for the haulage of cars or for the movement of the locomotive itself, an electric motor having sufficient power to haul a car or move the locomotive, a hollow non-rotary mast extending through the hollow shaft, a collector device comprising a non-rotary element on the said mast and a rotary element connected with the conductor cable, an electric conductor extending through the hollow mast and connected at one end with the non-rotary element of the collector device and at the other end with the motor, and two independent manually controllable clutches between the shaft and the respective reels.

13. In an electric locomotive, the combination with the frame, the supporting wheels and the motor, of a rotatable reel, an electric conductor cable connected with the reel to be wound thereon, an electric connection between the cable and the motor, and a power connection between the motor and the reel comprising a friction clutch and automatic means for causing a greater pressure between the clutch elements when the reel is rotated in the winding direction by the motor than when it is rotated in the unwinding direction by the cable.

In testimony whereof I affix my signature, in presence of two witnesses.

DUDLEY T. FISHER.

Witnesses:
WM. E. HAMILTON,
JOHN T. FOWLER.

Copies of this patent may be obtained for five cents each, by addressing the "Commissioner of Patents, Washington, D. C."